(12) United States Patent
Balasubramaniam et al.

(10) Patent No.: US 7,116,036 B2
(45) Date of Patent: Oct. 3, 2006

(54) ENERGY HARVESTING SYSTEM, APPARATUS AND METHOD

(75) Inventors: Mahadevan Balasubramaniam, Clifton Park, NY (US); Jeffrey Bernard Fortin, Niskayuna, NY (US); Walter John Smith, Ballston Spa, NY (US); Huageng Luo, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 50 days.

(21) Appl. No.: 10/909,062

(22) Filed: Aug. 2, 2004

(65) Prior Publication Data

US 2006/0022555 A1    Feb. 2, 2006

(51) Int. Cl.
*H01L 41/08* (2006.01)

(52) U.S. Cl. .................. 310/322; 310/339; 310/324; 310/334

(58) Field of Classification Search ................ 310/321, 310/322, 324, 330–332, 338, 339
See application file for complete search history.

(56) References Cited

U.S. PATENT DOCUMENTS

| | | | |
|---|---|---|---|
| 3,748,502 A | 7/1973 | Bernstein | |
| 4,005,319 A | 1/1977 | Nilsson et al. | |
| 4,160,234 A * | 7/1979 | Karbo et al. ................. | 340/443 |
| 4,170,769 A * | 10/1979 | Morris et al. ............ | 340/384.6 |
| 4,413,198 A * | 11/1983 | Bost ........................... | 310/324 |
| 4,467,236 A * | 8/1984 | Kolm et al. ................. | 310/321 |
| 4,504,761 A * | 3/1985 | Triplett ....................... | 310/339 |
| 4,602,245 A * | 7/1986 | Yang et al. .............. | 340/384.6 |
| 4,995,265 A * | 2/1991 | Stocker ....................... | 73/702 |
| 6,485,205 B1 * | 11/2002 | Luque ......................... | 400/56 |
| 6,573,833 B1 * | 6/2003 | Rosenthal ................ | 340/539.1 |
| 6,782,109 B1 * | 8/2004 | Sheplak et al. ............ | 381/191 |

* cited by examiner

*Primary Examiner*—Mark Budd
(74) *Attorney, Agent, or Firm*—William E. Powell, III; Donald S. Ingraham

(57) ABSTRACT

An energy harvesting device, system and method are described. The energy harvester collects acoustic energy and transforms it into electrical energy for use by a sensor. The energy harvester utilizes a piezoelectric device, which may be encased, either wholly or partially, within an acoustic chamber. Alternatively, the piezoelectric device may be entirely exterior to the acoustic chamber, which acts to amplify the collected acoustic energy.

63 Claims, 8 Drawing Sheets

ENERGY HARVESTING SYSTEM, APPARATUS AND METHOD

BACKGROUND

The invention relates generally to a system, apparatus and method for harvesting energy, and more particularly to an energy harvesting system, apparatus and method for harvesting acoustic energy and converting it into electrical energy for running a sensing assembly.

The U.S. Congress promulgated the Transportation Recall Enhancement, Accountability and Documentation (TREAD) Act in 2000. The TREAD Act provides that by the year 2007, all new motorized vehicles operated on the U.S. transportation system must include a tire pressure sensing system to monitor for and report the occurrence of unsafe tire pressure. The TREAD Act is applicable to all consumer and commercial trucks and automobiles.

The tire pressure sensing system is to include a tire pressure sensor mounted in a position suitable for determining the tire pressure, such as, for example, on a wheel rim within each tire. Current power sources for sensors include batteries and RF sources. The use of batteries in some applications has disadvantages. Batteries are not environmentally friendly, amounting to millions of discarded batteries per year. For applications where replacement of the battery is problematic, the only battery option is a lithium ion battery (Li/CFx), which is expensive. Further, batteries are subject to a loss in capacity at certain temperatures, such as at minus 40° C. Further, many batteries have a large enough size and mass to render them impracticable for certain applications.

There exists a need for an applicable power source capable of providing power to sensors in small or crowded environments. For example, there exists a need for a power source for the required tire sensors. The power source must have a small enough profile to fit within wheel rims. Further, the power source should be renewable or, at the very least, have a long lifetime to lessen the need for replacement.

SUMMARY

The present invention describes an apparatus, a system and a method for harvesting energy for use in powering a sensor.

One exemplary embodiment of the invention is an energy harvester that includes an acoustic chamber configured to collect acoustic energy, a back plate in connection with the acoustic chamber and configured to convert the collected acoustic energy into mechanical energy, and a piezoelectric device mounted to the back plate and configured to convert the mechanical energy into electrical energy.

One aspect of the energy harvester embodiment includes an acoustic chamber that amplifies the collected acoustic energy. Further, the energy harvester includes a low modulus material connecting the back plate with the acoustic chamber.

Another exemplary embodiment of the invention is an energy harvester that includes an acoustic chamber configured to collect acoustic energy and a piezoelectric device in connection with the acoustic chamber and configured to convert the collected acoustic energy into mechanical energy and to convert the mechanical energy into electrical energy.

Another exemplary embodiment of the invention is an energy harvesting system that includes a sensing assembly with a sensor for sensing a physical condition. The energy harvesting system includes an energy harvester with an acoustic chamber and configured to collect acoustic energy and transform the collected acoustic energy into electrical energy.

One aspect of the system embodiment is an air pressure sensing system for sensing the air pressure in an individual tire mounted on a wheel rim of a motorized vehicle. The air pressure sensing system includes a sensor mounted on the wheel rim and an energy harvester mounted on the wheel rim. The energy harvester includes an acoustic chamber and is configured to collect acoustic energy and transform the collected acoustic energy into electrical energy.

Another exemplary embodiment of the invention is a motorized vehicle that includes at least one wheel rim upon which is mounted a tire, a sensor mounted on the at least one wheel rim, and an energy harvester mounted on the at least one wheel rim and adapted to harvest acoustic energy and convert the acoustic energy to electrical energy.

Another exemplary embodiment of the invention is a method for powering a sensor that includes the steps of transforming acoustic energy into mechanical energy, converting the mechanical energy into electrical energy, and supplying the electrical energy to a sensor.

These and other advantages and features will be more readily understood from the following detailed description of preferred embodiments of the invention that is provided in connection with the accompanying drawings.

DETAILED DESCRIPTION OF EXEMPLARY EMBODIMENTS

Figure 1:
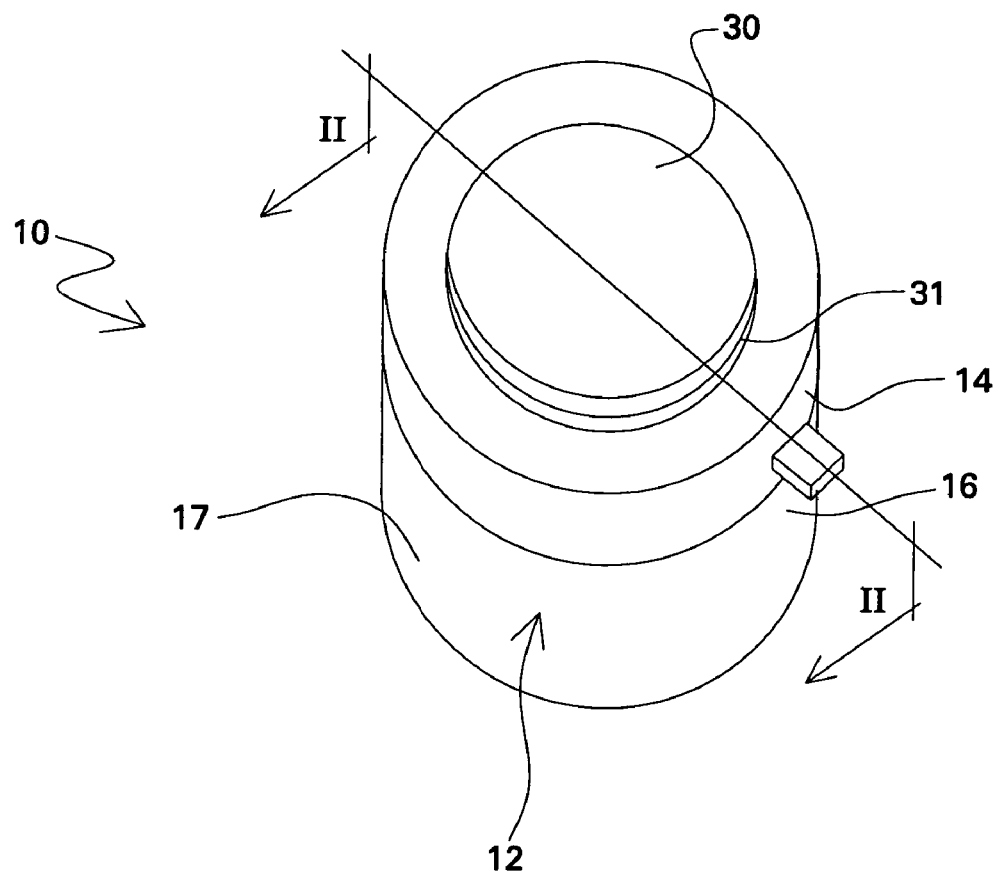
FIG. 1 is a perspective view of an energy harvester constructed in accordance with an exemplary embodiment of the invention.
Figure 2:
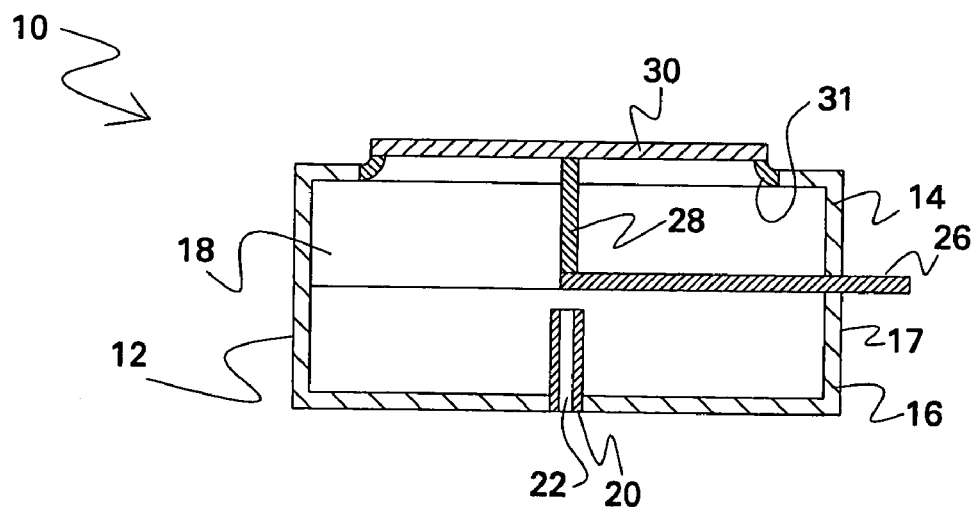
FIG. 2 is a cross-sectional view taken along line II—II of the energy harvester of FIG. 1.

Referring now to FIGS. 1 and 2, there is illustrated an energy harvester 10 including an acoustic chamber 12 and a back plate 30. The illustrated acoustic chamber 12 has a generally circular profile and includes a first and a second chamber portion 14, 16 defining a chamber space 18. It should be appreciated, however, that any geometric profile may be utilized for the chamber 12. The first chamber portion 14 includes a cavity 31 into which fits the back plate 30. A soft, low modulus material 31 connects the back plate 30 to an edge of the first chamber portion 14. The material 31 allows the back plate 30 to move, while concurrently providing a leak-free chamber 12.

The back plate 30 is attached to a piezoelectric device 26 through a support beam 28. The piezoelectric device 26 is supported at one end by the wall 17 of the second chamber portion 16, the other end supporting the back plate 30. The second chamber portion 16 includes an aperture 20 through which a channel 22 extends. With the exception of the channel 22, the chamber 12 is acoustically sealed (air tight).

The acoustic chamber 12 functions to collect acoustic energy, and the back plate 30 is forced to move by the acoustic energy. Thus, the acoustic energy is transformed into mechanical energy. Then, the piezoelectric device 26 attached to the back plate 30 serves to transform the mechanical energy into electrical energy. The acoustic chamber 12 also serves as a Helmholtz resonator, amplifying the collected acoustic energy.

Next will be described the functioning of the energy harvester 10. For illustration purposes only, the energy harvester 10 will be described in an application whereby a sensor being powered thereby is mounted on a wheel rim within a tire. Tires, which are shells that enclose a cavity, are continually compressed and relaxed as a result of the rolling motion of the tires on the ground. The physical properties of the shell, the air or other fluid medium within the shell, and the dimensions of the cavity dictate that the natural frequency of the shell and the rolling of the vehicle will induce a forcing function. When a vehicle rolls, the acoustic modes of the tires are excited. For example, a typical fifteen-inch tire has its first acoustic mode at about 220 Hertz, at which the pressure variation ranges from 0.005 to 0.01 psi. This pressure variation is the ultimate source of energy for the energy harvester 10.

A Helmholtz resonator is essentially an enclosed cylinder, such as the acoustic chamber 12, with an opening, such as the channel 22. The dimensions of the acoustic chamber 12, as with the tire, determine its acoustic properties. The acoustic modes of a Helmholtz resonator can be excited by outside pressure fluctuation and even by a steady flow over the opening. At the Helmholtz resonator's resonance frequency, the pressure inside the resonator can be amplified many times over that of the outside pressure. Thus, the acoustic chamber 12, if designed with a resonance frequency similar to that of the tire's, will allow for an amplification of the pressure variation in the tire of from one to ten times.

The acoustic energy collected in the acoustic chamber 12 is changed into mechanical energy through the movement of the back plate 30. The variation of pressure inside the acoustic chamber 12 applies a force across the back plate 30, thereby flexing the attached piezoelectric device 26 under strain. The piezoelectric device 26 converts this mechanical energy into electrical energy and outputs a voltage at its electrodes (not shown). For the illustrated energy harvester 10, the pressure variations at or near the resonance frequency of the acoustic chamber 12 push on the back plate 30, which in turn forces a strain through the support beam 28 onto the piezoelectric device 26, causing an output of voltage. The material 31 provides that the chamber 12 is leak-free. The output voltage is attached to an electrical circuit (not shown) that properly rectifies the signal, allowing it to power the sensor.

Figure 3:
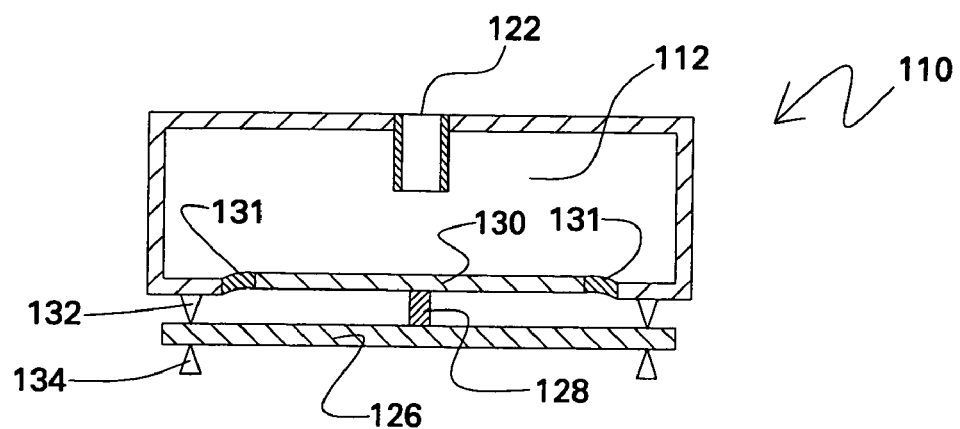
FIG. 3 is a cross-sectional view of an energy harvester constructed in accordance with another exemplary embodiment of the invention.
Figure 4:
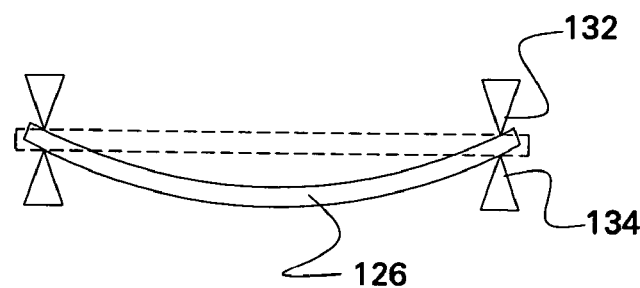
FIG. 4 is a side view illustrating the flexure of the piezoelectric device of FIG. 3.

Next, with reference to FIGS. 3 and 4, will be described an energy harvester 110. Unlike the energy harvester 10, the energy harvester 110 has a unitary acoustic chamber 112 and a piezoelectric device 126 positioned entirely exterior to the acoustic chamber 112. A channel 122 extends through one surface of the acoustic chamber 112, and a back plate 130 is located within an opening on an opposite surface thereof. The back plate 130 is connected to the surface with a soft, low modulus material 131, which serves to inhibit leaks from the chamber 112. The back plate 130 is mounted onto the piezoelectric device 126 through a support beam 128. The acoustic chamber 112 is mounted on the piezoelectric device 126 through one or more simple supports 132. The piezoelectric device 126 is itself mounted on a mounting surface, such as a wheel rim, through one or more simple supports 134. The simple supports 132, 134 each may be a single support mechanism, such as a ring, or separate support mechanisms, such as support beams. FIG. 4 illustrates the flexure of the piezoelectric device 126 while under strain. The simple supports 132, 134 are illustrated as such for simplicity sake, and it should be appreciated that the simple supports 132, 134 are to be configured to allow for necessary strain of the piezoelectric device 126.

Figure 5:
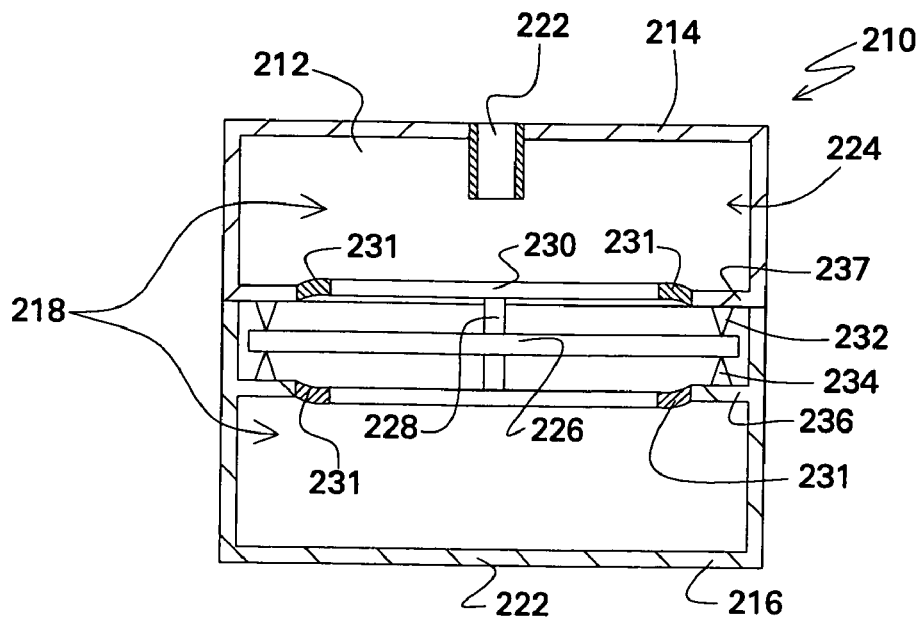
FIG. 5 is a cross-sectional view of an energy harvester constructed in accordance with another exemplary embodiment of the invention.

FIG. 5 illustrates another embodiment of the invention, specifically an energy harvester 210 that includes an acoustic chamber 212 formed of a first chamber portion 214 and a second chamber portion 216. The chamber portions 214, 216 define a chamber space 218, in which is positioned a back plate 230 and a piezoelectric device 226. The energy harvester 210 differs from previous energy harvester embodiments 10, 110 (FIGS. 1–4) in that the mechanism for converting the acoustic energy to electrical energy, i.e., the piezoelectric device 226, is housed entirely within the acoustic chamber 212. Further, a phase difference and pressure difference is introduced across the piezoelectric device 226 within the acoustic chamber 212.

The piezoelectric device 226 is mounted on the back plate 230 through a support beam 228. The piezoelectric device 226 is held in place between simple supports 232, 234. The simple supports 234 are positioned on a flange 236 in the second chamber portion 216. A soft, low modulus material 231 connects the back plate 230 with a second flange 237 to inhibit leakage from the acoustic chamber 212.

Figure 6:
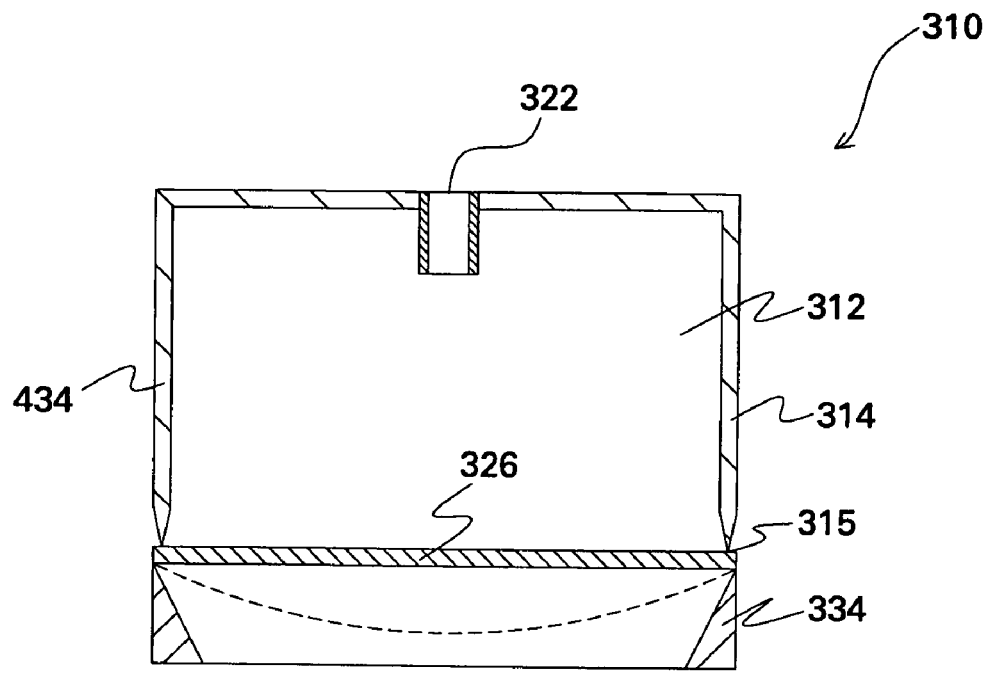
FIG. 6 is a cross-sectional view of an energy harvester constructed in accordance with another exemplary embodiment of the invention.

Next, with specific reference to FIG. 6, an energy harvester 310 is described. The energy harvester 310 includes an acoustic chamber 312 having a surface through which a channel 322 extends. A large opening extends through an opposing surface 337. A piezoelectric device 326 is positioned such that it forms one wall of the acoustic chamber 312. Specifically, the piezoelectric device 326 is pinioned between the pointed base 315 of wall 314 of the acoustic chamber 312 and a simple support 334. Piezoelectric device 326 functions to transform the acoustic energy to mechanical energy, and to transform the mechanical energy to electrical energy. The energy harvester 310 is mounted on a mounting surface with simple support 334.

Figure 7:
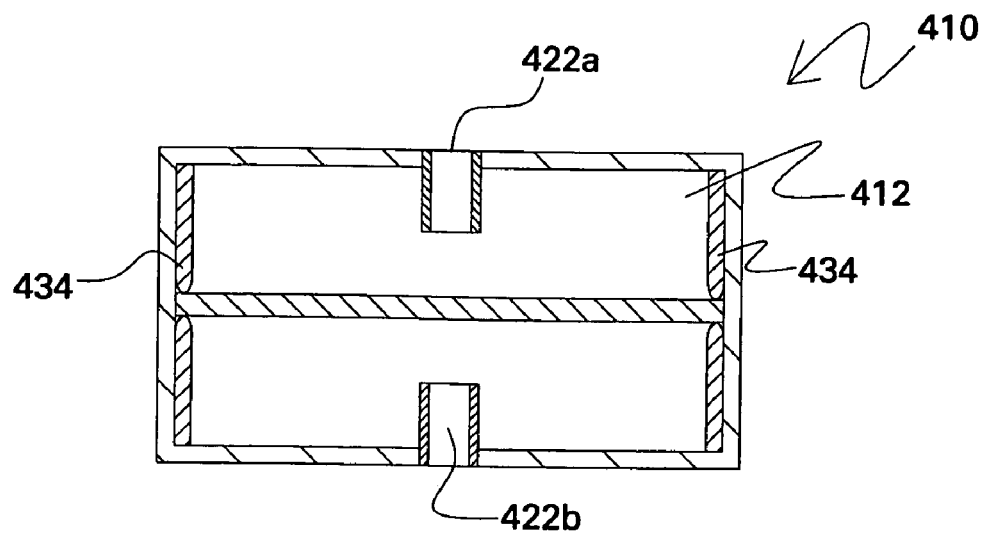
FIG. 7 is a cross-sectional view of an energy harvester constructed in accordance with another exemplary embodiment of the invention.

With reference to FIG. 7, an energy harvester 410 is shown including an acoustic chamber 412. The acoustic chamber 412 includes a pair of channels 422a, 422b, each extending through an opposing surface of the acoustic chamber. Positioned within the acoustic chamber 412 is a piezoelectric device 426. The piezoelectric device 426 is mounted in the acoustic chamber 412 on a pair of simple supports 434. The simple supports 434 may be configured as O-rings.

Figure 14:
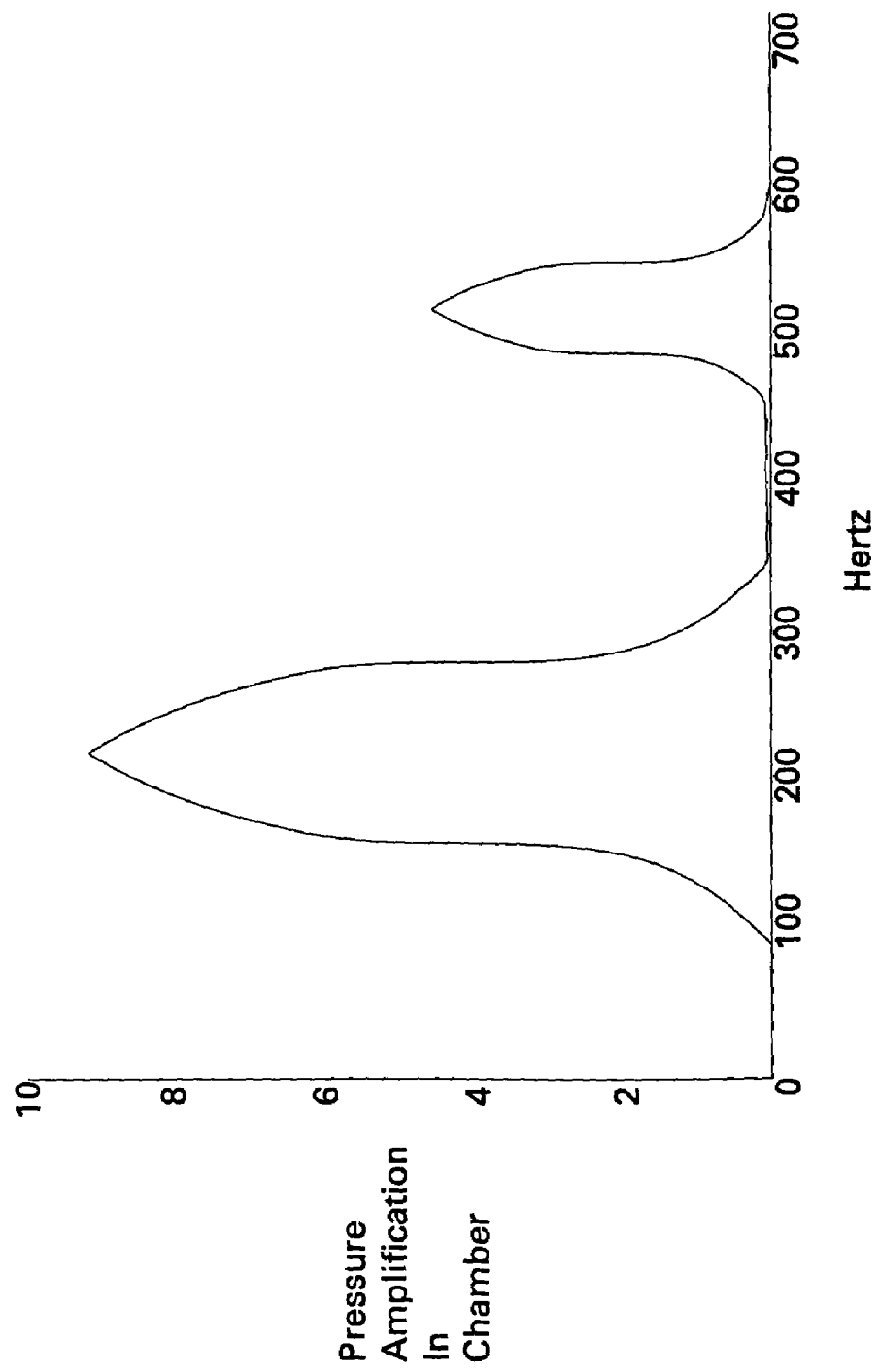
FIG. 14 is a graph plotting pressure amplifications experienced within a chamber of an exemplary embodiment of the energy harvesting system.

The channels 22, 122, 222, 322, 422a and 422b have all been shown as being straight. It should be appreciated that the dimensions of both the channel and the chamber determine the resonant frequency of the acoustic chamber. Thus, the channels 22, 122, 222, 322, 422a and 422b may take on another suitable profile. For example, each channel may be coiled, bent, angular, or labyrinthine. The coupled response of the Helmholtz resonator (the acoustic chamber) with the compliant back plate should match the frequency of the acoustic energy source, such as, for example, the tires of a vehicle. Preferably, the two coupled system resonant peaks should be in the range of about 150 to about 300 Hertz. FIG. 14 shows a coupled response at various frequencies. Specifically, a first peak is shown at about 230 Hz, while a second, smaller peak is shown at about 500 Hz.

It should be appreciated that, for some applications, such as, for example, powering a sensing assembly located on a wheel rim within a tire cavity, the dimensions of the acoustic chamber 12, 112, 212, 312, 412 need to be rather small, on the order of about a half inch in height and about two inches in diameter. With such dimensions, the energy harvester 10, 110, 210, 310, 410 may fit within housings for sensing assemblies that currently utilize a battery as an energy source.

Next will be described, with reference to FIGS. 8–11, an energy harvesting system 500. The energy harvesting system 500 includes a pressure sensor 502, an ASIC 504, a temperature sensor 506, and an RF transmitter 510. An energy harvester 10, 110, 210, 310, or 410 powers all the electronic components, the ASIC 504, the pressure sensor 502, the RF transmitter 510, etc. The sensor 502 is configured to transmit a signal to the RF antenna 510 through the ASIC 504, which in turn wirelessly transmits the signal to a display device 512. For a tire pressure monitoring application, the sensor 502 and the energy harvester 10, 110, 210, 310, or 410 are mounted on a wheel rim and the display 512 is located within the vehicle, such as on the dashboard. Although an ASIC 504 is shown and described, it should be appreciated that any apparatus capable of signal condition and microprocessing or micro-controlling may be utilized.

Providing an energy harvester 10, 110, 210, 310, or 410 with a sensor 502 for a tire pressure monitoring application will allow the sensor 502 to monitor and signal information pertaining to tire pressure while the vehicle is in motion and for a short period thereafter. This is due to the energy harvester 10, 110, 210, 310, or 410 deriving its energy from the pressure fluctuations experienced by the tire during rotation. If it is desired to maintain the ability to monitor and signal tire pressure information while the vehicle is motionless, an optional battery 508 may further be included. The battery 508 may be smaller, since its sole function would be to provide power to the sensor 502 only when energy from the energy harvester 10, 110, 210, 310, or 410 is insufficient to power the sensor 502.

The electronic signal from the energy harvester 10, 110, 210, 310, or 410 may be used by the electronics as a motion detector. Specifically, the energy harvester 10, 110, 210, 310, or 410 in conjunction with the battery 508 may signal a switch from one type of data collection that occurs during motion to a second, lower rate type of data collection that occurs in period of no motion.

Figure 9:
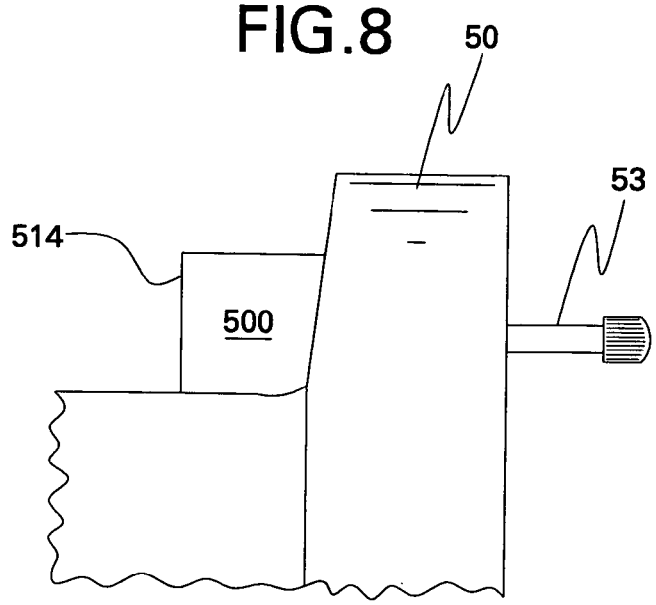
FIG. 9 is a partial side view illustrating the mounting of the energy harvesting system of FIG. 8 on a wheel rim in accordance with one aspect of the invention.
Figure 10:
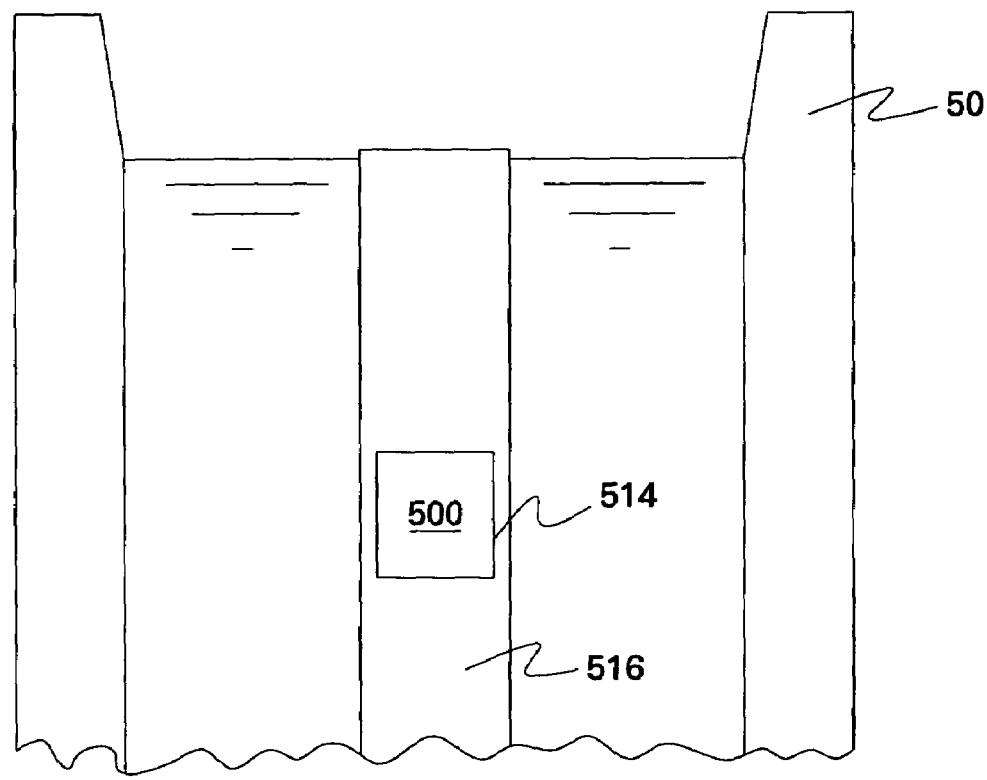
FIG. 10 is a partial side view illustrating the mounting of the energy harvesting system of FIG. 8 on a wheel rim in accordance with another aspect of the invention.
Figure 11:
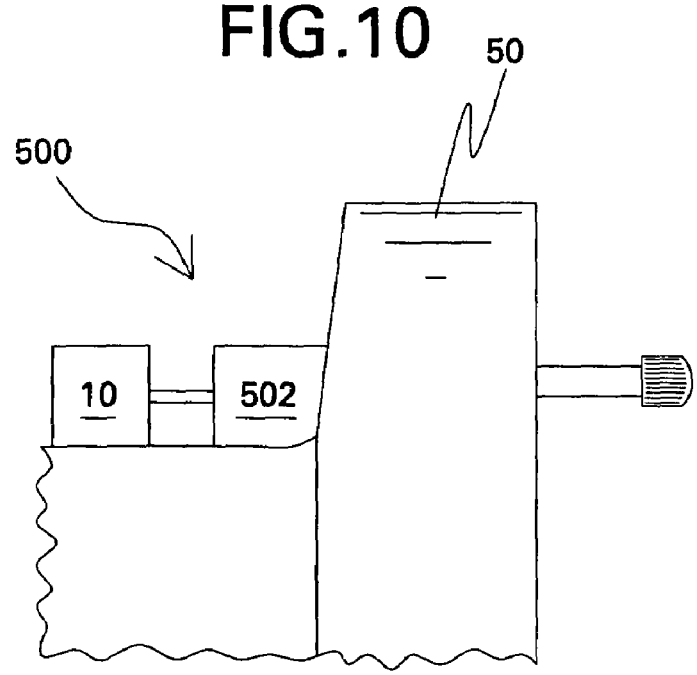
FIG. 11 is a partial side view illustrating the mounting of the energy harvesting system of FIG. 8 on a wheel rim in accordance with yet another aspect of the invention.
Figure 12:
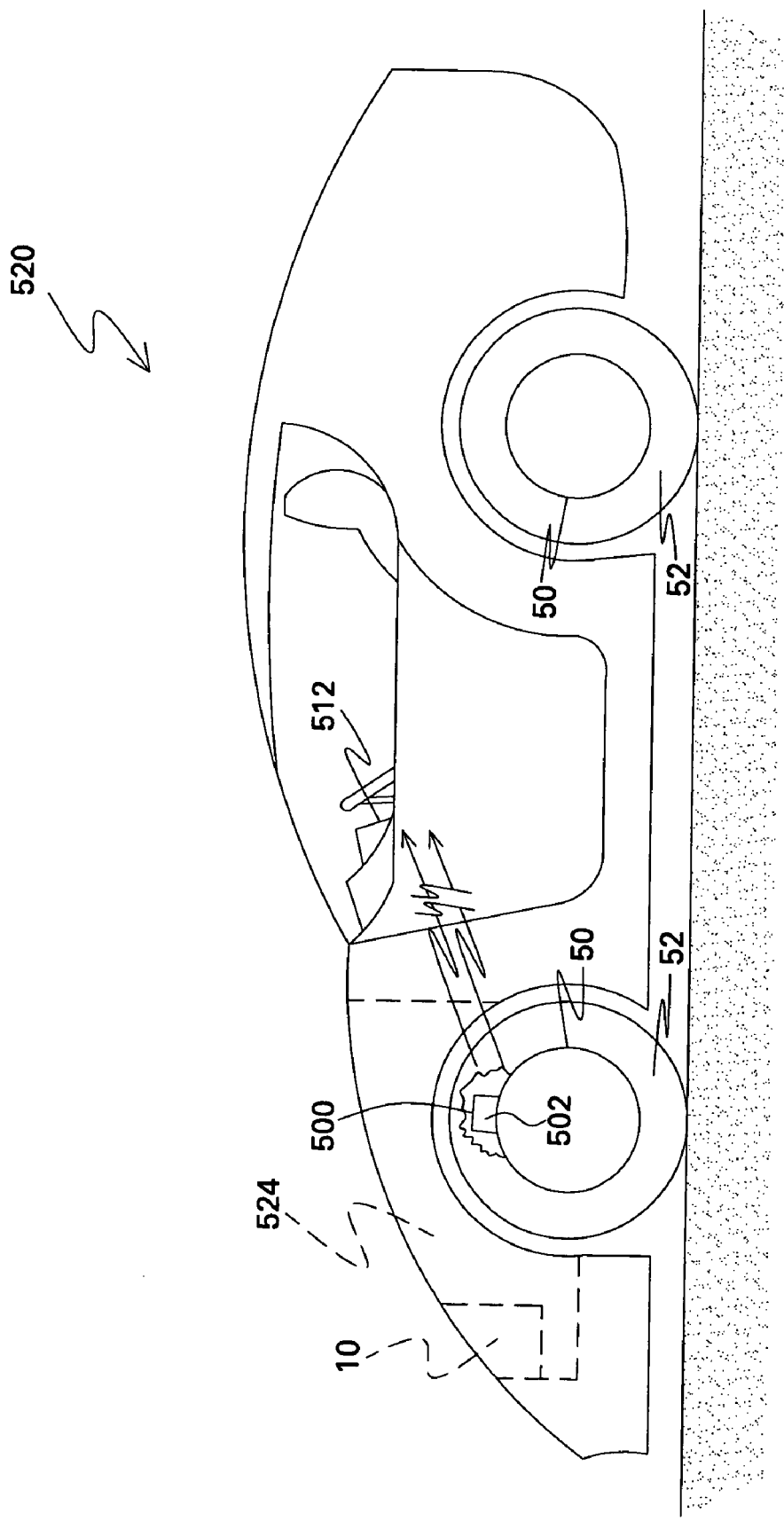
FIG. 12 is a schematic representation of a vehicle equipped with the system of FIG. 8.

With specific reference to FIGS. 9–11, the energy harvesting system 500 is shown mounted on a wheel rim 50. It should be appreciated that the system 500 may instead be mounted within each tire 52 (FIG. 12). In such an arrangement, vibration and/or strain, and not acoustic energy, would be used as the mechanical energy transformed into electrical energy to power the sensor. In FIGS. 9 and 10, the energy harvesting system 500 is within a housing 514. The system 500 may be mounted near and attached to a tire valve 53 (FIG. 9). Alternatively, the system 500 may be mounted on the wheel rim 50 through the use of a strap 516 (FIG. 10). Or, as shown in FIG. 11, the energy harvesting system 500 may be the sensor 502 and the energy harvester 10, 110, 210, 310, or 410 separately housed.

Figure 8:
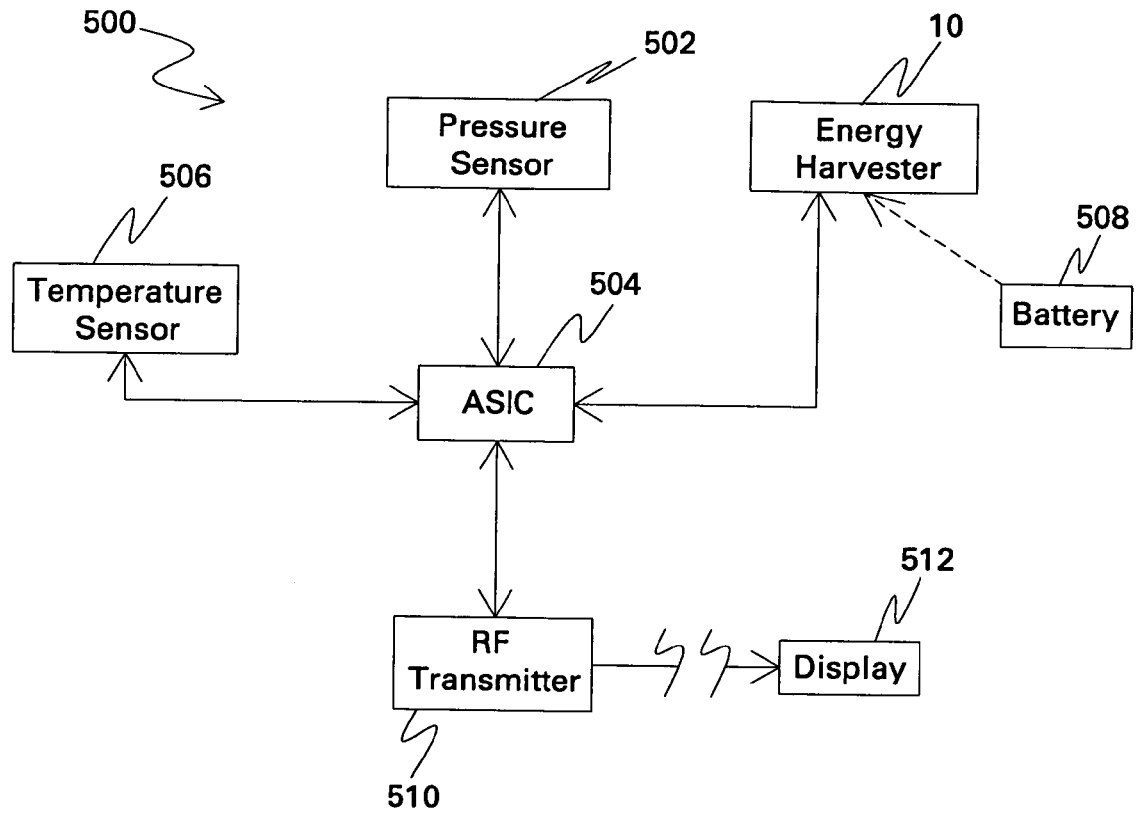
FIG. 8 illustrates an energy harvesting system in accordance with another exemplary embodiment of the invention.

Shown schematically in FIG. 12 is a motorized vehicle 520 incorporating the energy harvesting system 500. As shown, the energy harvesting system 500 is mounted on a left front wheel rim 50. For simplicity of illustration, the remaining energy harvesting systems 500 on the mounted wheels, as well as on the spare tire wheel are not shown. The energy harvesting system 500 may include the optional battery 508 (FIG. 8). The energy harvesting system 500 wirelessly reports data from the sensor 502 through the RF transmitter 510 (FIG. 8) to the display 512, shown in FIG. 12 to be located on the dashboard of the vehicle 520. Although a passenger vehicle is shown in FIG. 12, it should be appreciated that the energy harvesting system 500 may be incorporated on any motorized vehicle traveling on roadways, including, for example, commercial and consumer trucks, commercially-operated and municipality-operated (including school) buses, commercially-operated automobiles, and motorcycles and all-terrain vehicles.

It should be further appreciated that the foregoing is not an exhaustive list of potential applications for the energy harvesting system 500. For example, an energy harvester 10, 110, 210, 310, or 410 may be positioned within the engine well 524 (FIG. 12). The energy harvester 10, 110, 210, 310, or 410 may provide power to a sensor used for wireless sensing of vibration, temperature, pressure, or other physical parameters associated with the engine and its performance. For example, the energy harvester 10, 110, 210, 310, or 410 may be used to provide power to a sensor or sensors monitoring the health of the engine of a motorized vehicle (automobile, truck, aircraft, marine, etc.). Alternatively, the energy harvester 10, 110, 210, 310, or 410 may provide power to a sensor to monitor something unrelated to the engine performance, such as, for example, current in a wire running near the engine. It also should be appreciated that the energy harvester 10, 110, 210, 310, or 410 may be utilized to provide power to sensors used in turbines (power generation, aircraft, or marine) or any other noise source with sufficient noise to produce acoustic energy in abundant supply. Obviously, each source of noise will have a unique frequency spectrum, and the energy harvester 10, 110, 210, 310, or 410 will need to be designed accordingly.

Figure 13:
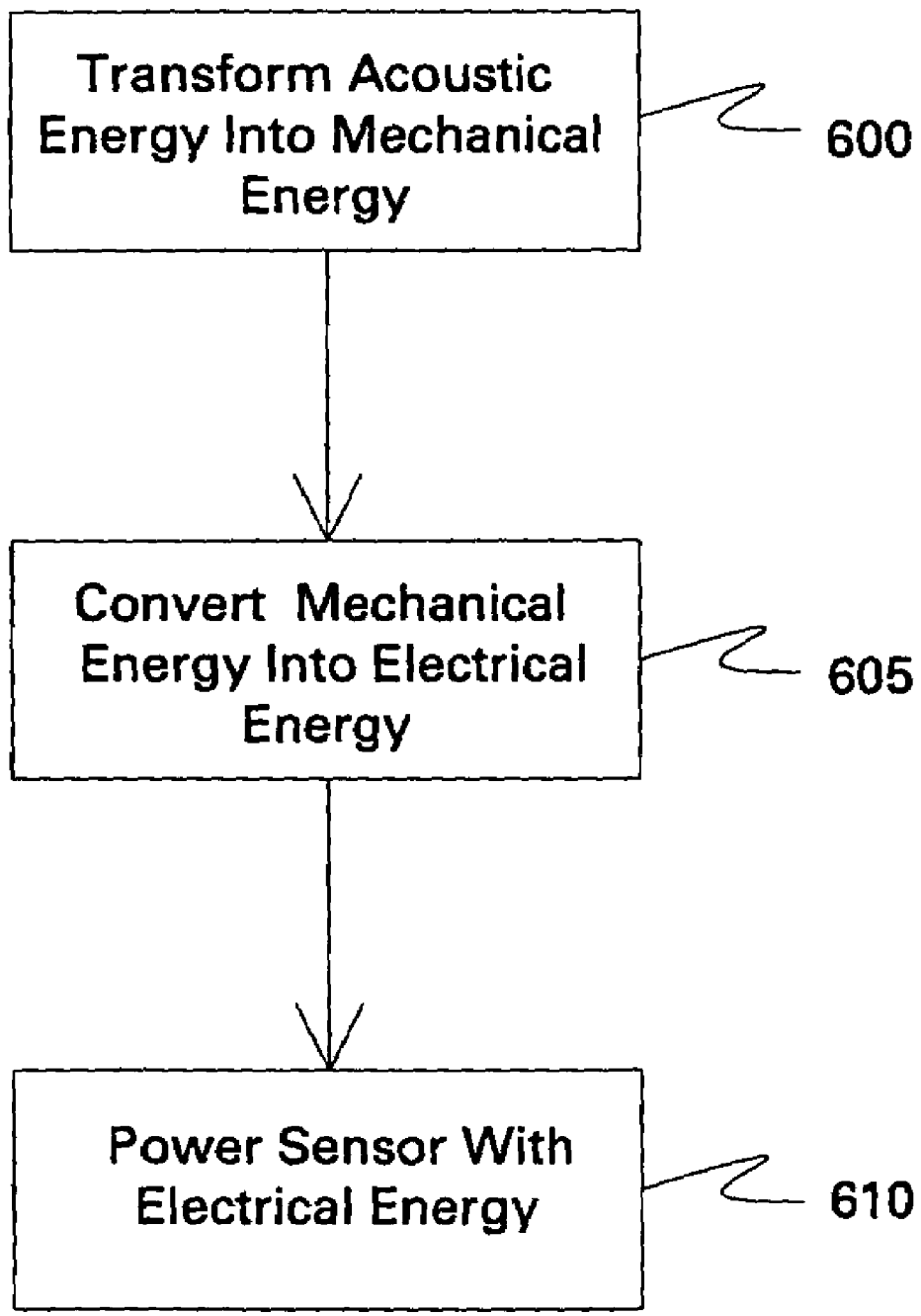
FIG. 13 illustrates process steps for harvesting energy and powering a sensor in accordance with another exemplary embodiment of the invention.

With reference to FIG. 13, next will be described a method for powering a sensing assembly, such as the assembly including sensor 502, ASIC 504 and RF transmitter 510. At Step 600, acoustic energy is transformed into mechanical energy. In the tire pressure monitoring application, acoustic energy is created due to the continuously fluctuating pressure within a tire in motion, and that acoustic energy may be collected within an acoustic chamber 12, 112, 212, 312, 412 which functions as a Helmholtz resonator. The back plate 30, 130, 230, or the piezoelectric device 326, 426 transforms the acoustic energy to mechanical energy, as evidenced by flexure caused by strain induced by a change in pressure in the acoustic chamber 12, 112, 212, 312, 412.

At Step 605, the mechanical energy is converted into electrical energy. The piezoelectric device 26, 126, 226, 326, 426 is flexed under strain due to the change in pressure in the acoustic chamber 12, 112, 212, 312, 412 and converts the strain into electrical energy. At Step 610, the sensor 502 is powered with the electrical energy. The piezoelectric device 26, 126, 226, 326, 426 outputs the voltage through electrodes, which are in connection with an electrical circuit that rectifies the voltage (altering the voltage from alternate current to direct current).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while the energy harvester and the energy harvesting system have been described in conjunction with a tire pressure monitoring application and a motor health monitoring application, it should be appreciated that the energy harvester and energy harvesting system may find utility for any application in which acoustic energy can be collected and transformed into electrical energy, such as, for example, monitoring physical parameters of a machine that produces vibrations or industrial process monitoring. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An energy harvester, comprising:
   an acoustic chamber configured to collect acoustic energy;
   a back plate in connection with said acoustic chamber and configured to convert the collected acoustic energy into mechanical energy; and
   a piezoelectric device mounted to said back plate and configured to convert the mechanical energy into electrical energy, wherein said back plate is supported on said piezoelectric device by a support beam.

2. The energy harvester of claim 1, wherein said acoustic chamber amplifies the collected acoustic energy.

3. The energy harvester of claim 1, wherein said back plate is in connection with said acoustic chamber through a low modulus material.

4. The energy harvester of claim 1, wherein said piezoelectric device is at least partially resident within said acoustic chamber.

5. The energy harvester of claim 4, wherein said piezoelectric device is a cantilever supported at one end by a wall of said acoustic chamber.

6. The energy harvester of claim 4, wherein said piezoelectric device is supported entirely within said acoustic chamber.

7. The energy harvester of claim 1, wherein said acoustic chamber comprises first and second chamber portions.

8. The energy harvester of claim 1, wherein said support beam is positioned within said acoustic chamber.

9. The energy harvester of claim 1, wherein said support beam is positioned exterior to said acoustic chamber.

10. The energy harvester of claim 1, further comprising a battery for supplying electrical energy to said sensor when the amount of the acoustic energy is insufficient for powering said sensor.

11. The energy harvester of claim 10, wherein the electrical output of the energy harvester is used to detect the motion of a vehicle.

12. The energy harvester of claim 1, wherein resonant peaks of the energy harvester are in the range of about 200 to about 300 Hertz.

13. The energy harvester of claim 1, further comprising at least one channel extending through at least one surface of said acoustic chamber.

14. The energy harvester of claim 13, wherein said at least one channel extends into said acoustic chamber perpendicular to the at least one surface.

15. An energy harvester, comprising:
    an acoustic chamber configured to collect acoustic energy;
    at least one channel extending through at least one surface of said acoustic chamber;
    a back plate in connection with said acoustic chamber and configured to convert the collected acoustic energy into mechanical energy; and
    a piezoelectric device mounted to said back plate and configured to convert the mechanical energy into electrical energy, wherein said at least one channel extends in a spiral configuration or a labyrinthine configuration or said at least one channel exhibits a bend within said acoustic chamber.

16. An energy harvester, comprising:
    an acoustic chamber configured to collect acoustic energy, wherein said acoustic chamber amplifies the collected acoustic energy;
    a back plate configured to convert the collected acoustic energy into mechanical energy;
    a low modulus material connecting said back plate with said acoustic chamber; and
    a piezoelectric device mounted to said back plate and configured to convert the mechanical energy into electrical energy, wherein said back plate is supported on said piezoelectric device by a support beam.

17. The energy harvester of claim 16, wherein said piezoelectric is supported at one end by a wall of said acoustic chamber and is at least partially resident within said acoustic chamber.

18. The energy harvester of claim 16, wherein said piezoelectric device is supported entirely within said acoustic chamber.

19. The energy harvester of claim 16, wherein said support beam is positioned within said acoustic chamber.

20. The energy harvester of claim 16, wherein said support beam is positioned exterior to said acoustic chamber.

21. The energy harvester of claim 16, further comprising a battery for supplying electrical energy to said sensor when the amount of the acoustic energy is insufficient for powering said sensor.

22. The energy harvester of claim 21, wherein the electrical output of the energy harvester is used to detect the motion of a vehicle.

23. The energy harvester of claim 16, wherein resonant peaks of the energy harvester are in the range of about 150 to about 300 Hertz.

24. The energy harvester of claim 16, further comprising at least one channel extending through at least one surface of said acoustic chamber.

25. An energy harvester, comprising:
   an acoustic chamber configured to collect acoustic energy;
   at least one channel extending through at least one surface of said acoustic chamber, wherein said at least one channel extends in a spiral configuration or a labyrinthine configuration or said at least one channel exhibits a bend within said acoustic chamber; and
   a piezoelectric device in connection with said acoustic chamber and configured to convert the collected acoustic energy into mechanical energy and to convert the mechanical energy into electrical energy.

26. The energy harvester of claim 25, wherein said piezoelectric device is positioned within said acoustic chamber.

27. The energy harvester of claim 25, wherein said acoustic chamber exhibits a resonant frequency in the range of about 200 to about 300 Hertz.

28. An energy harvesting system, comprising:
   a sensing assembly including a sensor for sensing a physical condition;
   an energy harvester including a chamber and configured to collect acoustic, vibration or strain energy and transform the collected acoustic, vibration or strain energy into electrical energy; and
   at least one channel extending through at least one surface of said chamber, wherein said at least one channel extends in a spiral configuration or labyrinthine configuration or said at least one channel exhibits a bend within said chamber.

29. The energy harvesting system of claim 28, wherein said energy harvester comprises:
   a back plate in connection with said chamber and configured to convert the collected acoustic, vibration or strain energy into mechanical energy; and
   a piezoelectric device mounted to said back plate and configured to convert the mechanical energy into electrical energy.

30. The energy harvesting system of claim 28, wherein said energy harvester comprises a piezoelectric device in connection with said chamber and configured to convert the collected acoustic, vibration or stain energy into mechanical energy and to convert the mechanical energy into electrical energy.

31. The energy harvesting system of claim 28, wherein said chamber is a Helmholtz resonator.

32. The energy harvesting system of claim 28, wherein said piezoelectric device is at least partially resident within said chamber.

33. The energy harvesting system of claim 28, wherein said piezoelectric device is supported entirely within said chamber.

34. The energy harvesting system of claim 28, wherein said chamber comprises first and second chamber portions.

35. The energy harvesting system of claim 28, further comprising a battery for supplying electrical energy to said sensor when the amount of the collected acoustic, vibration or strain energy is insufficient for powering said sensor.

36. The energy harvesting system of claim 35, wherein the electrical output of the energy harvester is used to detect the motion of a vehicle.

37. The energy harvesting system of claim 28, wherein resonant peaks of the energy harvester are in the range of about 150 to about 300 Hertz.

38. The energy harvesting system of claim 28, wherein the sensing assembly is configured to sense vibration, temperature, pressure, or electrical current.

39. The energy harvesting system of claim 28, wherein the sensing assembly is configured to monitor the health of one or more of the group consisting of motorized vehicle engine, aircraft engine, marine engine, turbine, and industrial process.

40. An air pressure sensing system for sensing the air pressure in an individual tire mounted in proximity to a wheel rim of a motorized vehicle, comprising:
   a sensor mounted in proximity to the wheel rim;
   an energy harvester mounted in proximity to the wheel rim and including an acoustic chamber, wherein said energy harvester is configured to collect acoustic energy and transform the collected acoustic energy into electrical energy; and
   at least one channel extending through at least one surface of said acoustic chamber, wherein said at least one channel extends in a spiral configuration or labyrinthine configuration or said at least one channel exhibits a bend within said acoustic chamber.

41. The air pressure sensing system of claim 40, wherein said energy harvester comprises:
   a back plate in connection with said acoustic chamber and configured to convert the collected acoustic energy into mechanical energy; and
   a piezoelectric device mounted to said back plate and configured to convert the mechanical energy into electrical energy.

42. The air pressure sensing system of claim 40, wherein said energy harvester comprises a piezoelectric device in connection with said acoustic chamber and configured to convert the collected acoustic energy into mechanical energy and to convert the mechanical energy into electrical energy.

43. The air pressure sensing system of claim 40, further comprising a tire valve.

44. The air pressure sensing system of claim 40, wherein said sensor and said energy harvester are mounted to the wheel rim within a unitary housing.

45. The air pressure sensing system of claim 44, wherein said unitary housing is mounted to the wheel rim with a strap.

46. The air pressure sensing system of claim 40, further comprising a battery for supplying electrical energy to said sensor when the amount of the acoustic energy is insufficient for powering said sensor.

47. The air pressure sensing system of claim 46, wherein the electrical output of the energy harvester is used to detect the motion of a vehicle.

48. The air pressure sensing system of claim 40, wherein resonant peaks of the energy harvester are in the range of about 150 to about 300 Hertz.

49. A motorized vehicle, comprising:
   at least one wheel rim upon which is mounted a tire;
   a sensor mounted on said at least one wheel rim;
   an acoustic chamber configured to collect acoustic energy;
   an energy harvester mounted on said at least one wheel rim and adapted to harvest the collected acoustic energy and convert the acoustic energy to electrical energy; and
   at least one channel extending through at least one surface of said acoustic chamber, wherein said at least one channel extends in a spiral configuration or a labyrinthine configuration or said at least one channel exhibits a bend within said acoustic chamber.

50. The motorized vehicle of claim 49, wherein said energy harvester comprises:
   a back plate in connection with said acoustic chamber and configured to convert the collected acoustic energy into mechanical energy; and
   a piezoelectric device mounted to said back plate and configured to convert the mechanical energy into electrical energy.

51. The motorized vehicle of claim 49, wherein said energy harvester comprises a piezoelectric device in connection with said acoustic chamber and configured to convert the collected acoustic energy into mechanical energy and to convert the mechanical energy into electrical energy.

52. The motorized vehicle of claim 51, wherein said acoustic chamber is a Hehnholtz resonator.

53. The motorized vehicle of claim 49, further comprising a battery for supplying electrical energy to said sensor when the amount of the acoustic energy is insufficient for powering said sensor.

54. A method for powering a sensor, comprising:
   transforming acoustic, vibrational, or strain energy into mechanical energy with an energy harvester, comprising:
      a back plate in connection with a chamber and configured to convert the collected acoustic, vibrational, or strain energy into mechanical energy; and
      a piezoelectric device mounted to said back plate and configured to convert the mechanical energy into electrical energy, wherein said back plate is supported on said piezoelectric device by a support beam;
   converting the mechanical energy into electrical energy; and
   supplying the electrical energy to a sensor.

55. The method of claim 54, wherein the sensor is mounted near or on a source of the acoustic, vibrational, or strain energy.

56. The method of claim 55, wherein the source of the acoustic, vibrational, or strain energy comprises one or more from the group consisting of motorized vehicle, turbine, and industrial process machine.

57. The method of claim 54, wherein the sensor is mounted on a wheel rim of a motorized vehicle.

58. The method of claim 57, wherein the sensor is configured to monitor pressure within a tire mounted on the wheel rim.

59. The method of claim 58, further comprising obtaining the acoustic, vibrational, or strain energy from within the tire.

60. The method of claim 59, wherein the acoustic energy is produced due to pressure fluctuation within the tire.

61. The method of claim 54, wherein said transforming step comprises:
   collecting the acoustic, vibrational, or strain energy; and
   transforming the acoustic, vibrational, or strain energy into the mechanical energy with an energy harvester that comprises a piezoelectric device in connection with a chamber and configured to convert the collected acoustic, vibrational, or strain energy into mechanical energy and to convert the mechanical energy into electrical energy.

62. The method of claim 54, further comprising supplying electrical energy to the sensor from a battery when the amount of the acoustic, vibrational, or strain energy is insufficient for powering the sensor.

63. The method of claim 62, further comprising detecting the motion of a vehicle with the energy harvester.

* * * * *